US006928646B1

(12) United States Patent
James et al.

(10) Patent No.: US 6,928,646 B1
(45) Date of Patent: Aug. 9, 2005

(54) SYSTEM AND METHOD FOR EFFICIENTLY PERFORMING SCHEDULING OPERATIONS IN AN ELECTRONIC DEVICE

(75) Inventors: David V. James, Palo Alto, CA (US); Glen D. Stone, Campbell, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/496,323

(22) Filed: Feb. 2, 2000

(51) Int. Cl.[7] ............................................... G06F 9/46
(52) U.S. Cl. ..................... 718/104; 718/103; 718/100; 718/105
(58) Field of Search ................................. 718/1–108

(56) References Cited

U.S. PATENT DOCUMENTS

| 4,371,752 A | | 2/1983 | Matthews et al. ...... 179/7.1 TP |
| 4,972,314 A | | 11/1990 | Getzinger et al. .......... 364/200 |
| 5,276,684 A | * | 1/1994 | Pearson ..................... 370/438 |
| 5,802,394 A | | 9/1998 | Baird et al. .................. 395/825 |
| 5,832,262 A | | 11/1998 | Johnson et al. ............. 395/672 |
| 6,385,638 B1 | * | 5/2002 | Baker-Harvey ............. 718/107 |
| 6,424,989 B1 | * | 7/2002 | Shaw et al. ................. 709/201 |
| 6,567,840 B1 | * | 5/2003 | Binns et al. ................. 718/103 |
| 6,587,938 B1 | * | 7/2003 | Eilert et al. ................... 712/29 |
| 2004/0040025 A1 | * | 2/2004 | Lehtinen ..................... 718/104 |

* cited by examiner

*Primary Examiner*—Lewis A. Bullock, Jr.
*Assistant Examiner*—Kenneth Tang
(74) *Attorney, Agent, or Firm*—Gregory J. Koerner; Redwood Patent Law (57) ABSTRACT

A system and method for efficiently performing scheduling operations in an electronic device comprises an allocation manager that initially evaluates a task scheduling request based upon certain request parameters. The request parameters may include a resource requirement and an execution interval. If the task scheduling request is granted, then the allocation manager adds the corresponding task to a prioritized task table. A scheduling manager may then reference the task table to efficiently identify the next task for scheduling and execution on the electronic device.

37 Claims, 9 Drawing Sheets

SYSTEM AND METHOD FOR EFFICIENTLY PERFORMING SCHEDULING OPERATIONS IN AN ELECTRONIC DEVICE

BACKGROUND OF THE INVENTION

1. Field of the Invention

This invention relates generally to techniques for performing scheduling operations, and relates more particularly to a system and method for efficiently performing scheduling operations in an electronic device.

2. Description of the Background Art

Implementing effective methods for performing various processing tasks in electronic devices is a significant consideration for designers and manufacturers of contemporary electronic devices. For example, an electronic device may advantageously communicate with other electronic devices in an electronic network to share data to thereby substantially increase the capabilities and versatility of individual devices in the electronic network. In certain instances, an electronic network may be implemented in a home environment to enable flexible and beneficial sharing of data and device resources between various consumer electronic devices, such as personal computers, digital video disc (DVD) devices, digital set-top boxes for digital broadcasting, enhanced television sets, and audio reproduction systems.

Effectively managing task scheduling operations in a network of electronic devices may create substantial challenges for designers of electronic devices. For example, enhanced demands for increased device functionality and performance may require more system processing power and require additional resources. An increase in processing or hardware requirements may also result in a corresponding detrimental economic impact due to increased production costs and operational inefficiencies.

Network size is also a factor that affects scheduling operations in an electronic device. Communications in an electronic network typically become more complex as the number of individual devices or nodes increases. Assume that a particular device on an electronic network is defined as a local device with local software elements, and other devices on the electronic network are defined as remote devices with remote software elements. Accordingly, a local software module on the local device may need to transfer data to various remote software elements on remote devices across the electronic network. However, successfully managing a substantial number of electronic devices across a network may provide significant benefits to a system user.

Furthermore, enhanced device capability to perform various advanced processing tasks may provide additional benefits to a system user, but may also place increased demands on the control and management of the various devices in the electronic network. For example, an enhanced electronic network that effectively accesses, processes, and displays digital television programming may benefit from efficient network communication techniques because of the large amount and complexity of the digital data involved.

Due to growing demands on system processor resources and substantially increasing data magnitudes, it is apparent that developing new and effective methods for scheduling processing tasks is a matter of importance for the related electronic technologies. Therefore, for all the foregoing reasons, implementing effective methods for performing processing tasks in electronic devices remains a significant consideration for designers, manufacturers, and users of contemporary electronic devices.

SUMMARY OF THE INVENTION

In accordance with the present invention, a system and method are disclosed for efficiently performing scheduling operations in an electronic device. In one embodiment, initially, device software generates a scheduling request to an allocation manager to thereby request the scheduling and execution of a particular task. The foregoing scheduling request preferably includes an execution interval T and a resource requirement that correspond to the requested task.

The execution interval T preferably includes information that specifies a time period within which the corresponding requested task must complete execution on the electronic device. The resource requirement preferably includes information to specify how much of overall device resources will be consumed while executing the corresponding task.

In response to the scheduling request, the allocation manager determines whether scheduling the requested task is permissible in light of available device resources. In addition, the allocation manager preferably evaluates request parameters to ensure that the duration of the execution interval T conforms to certain execution specifications. In one embodiment, the foregoing execution specifications preferably require that the execution interval for each task be an even multiple of a power of two times the duration of a reference base cycle.

If sufficient resources are available, and if the execution interval T conforms to the execution specifications, then the allocation manager preferably may add the requested task to a prioritized task table. In one embodiment, the allocation manager preferably ranks the tasks in the task table according to their execution priority level which is inversely proportional to the respective execution intervals.

A scheduling manager then preferably may reference the task table to identify a next task for scheduling and execution on the electronic device. The scheduling manager preferably selects the next task for scheduling and execution by identifying the task that has the highest priority (shortest execution interval) which also has not already consumed its allocated resources during the current base cycle.

Once the next task is identified for scheduling and execution, then the scheduling manager preferably may reference a "ready-to-run" table to determine whether the identified next task is in a ready state. Presuming that the identified next task is ready for execution, then the scheduling manager preferably schedules and starts the execution of that task on the electronic device. In one embodiment, the scheduling manager may preferably monitor a "resources-consumed" table that is constantly updated to indicate the amount of resources that have been consumed by execution of the current task.

The scheduling manager may thus compare the consumed resources with the allocated resources, and then terminate a current task when its resource allocation limit is reached to thereby allow another task to be scheduled and executed. The present invention thus advantageously utilizes the allocation manager, the task table, and the scheduling manager to efficiently schedule a sequence of tasks on an electronic device.

DETAILED DESCRIPTION OF THE PREFERRED EMBODIMENT

The present invention relates to an improvement in electronic devices The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention comprises a system and method for efficiently performing scheduling operations in an electronic device, and includes an allocation manager that initially evaluates a task scheduling request based upon certain request parameters. The request parameters may include a resource requirement and an execution interval. If the task scheduling request is granted, then the allocation manager adds the corresponding task to a prioritized task table. A scheduling manager may then reference the task table to efficiently identify the next task for scheduling and execution on the electronic device.

Figure 1:
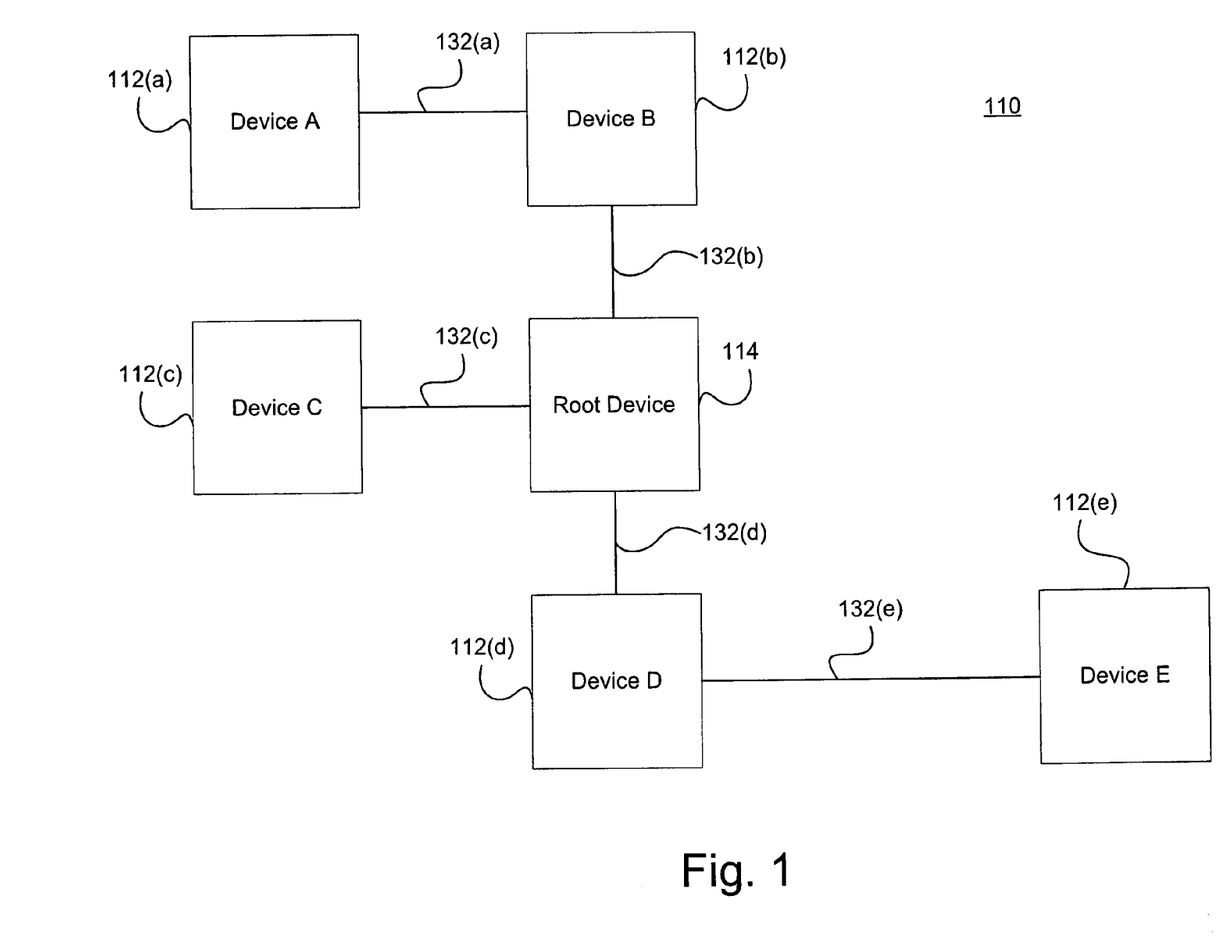
FIG. 1 is a block diagram for one embodiment of an electronic network, in accordance with the present invention.

Referring now to FIG. 1, a block diagram for one embodiment of an electronic network 110 is shown, according to the present invention. In the FIG. 1 embodiment, network 110 preferably comprises, but is not limited to, a number of electronic devices 112 (device A 112(a), device B 112(b), root device 114, device C 112(c), device D 112(d), and device E 112(e)). In alternate embodiments, electronic network 110 may readily be configured to include various other devices 112 or components that function in addition to, or instead of, those discussed in conjunction with the FIG. 1 embodiment. In alternate embodiments, network 110 may readily be connected and configured in any other appropriate and suitable manner.

In the FIG. 1 embodiment, devices 112 of network 110 may be implemented as any type of electronic device, including, but not limited to, personal computers, printers, digital video disc devices, television sets, audio systems, video cassette recorders, and set-top boxes for digital broadcasting. In the FIG. 1 embodiment, devices 112 preferably communicate with one another using a bus link 132. Bus link 132 preferably includes path 132(a), path 132(b), path 132(c), path 132(d), and path 132(e). For example, in one embodiment, device B 112(b) is coupled to device A 112(a) via path 132(a), and to root device 114 via path 132(b). Similarly, root device 114 is coupled to device C 112(c) via path 132(c), and to device D 112(d) via path 132(d). In addition, device D 112(d) is coupled to device E 112(e) via path 132(e). In the FIG. 1 embodiment, bus link 132 is preferably implemented using a P1394 Standard for a High Performance Serial Bus, IEEE, 1995, which is hereby incorporated by reference. However, in alternate embodiments, network 110 may readily communicate and function using various other network methodologies which are equally within the scope of the present invention.

In the FIG. 1 embodiment, each device in electronic network 110 may preferably communicate with any other device within network 110. For example, device E 112(e) may communicate with device B 112(b) by transmitting transfer data via cable 132(e) to device D 112(d), which then may transmit the transfer data via cable 132(d) to root device 114. In response, root device 114 then may transmit the transfer data to device B 112(b) via cable 132(b). In the FIG. 1 embodiment, root device 114 preferably provides a master cycle start signal to synchronize isochronous processes for devices 112 in network 110. In other embodiments of network 110, any one of the network devices 112 may be designated as the root device or cycle master.

Figure 2:
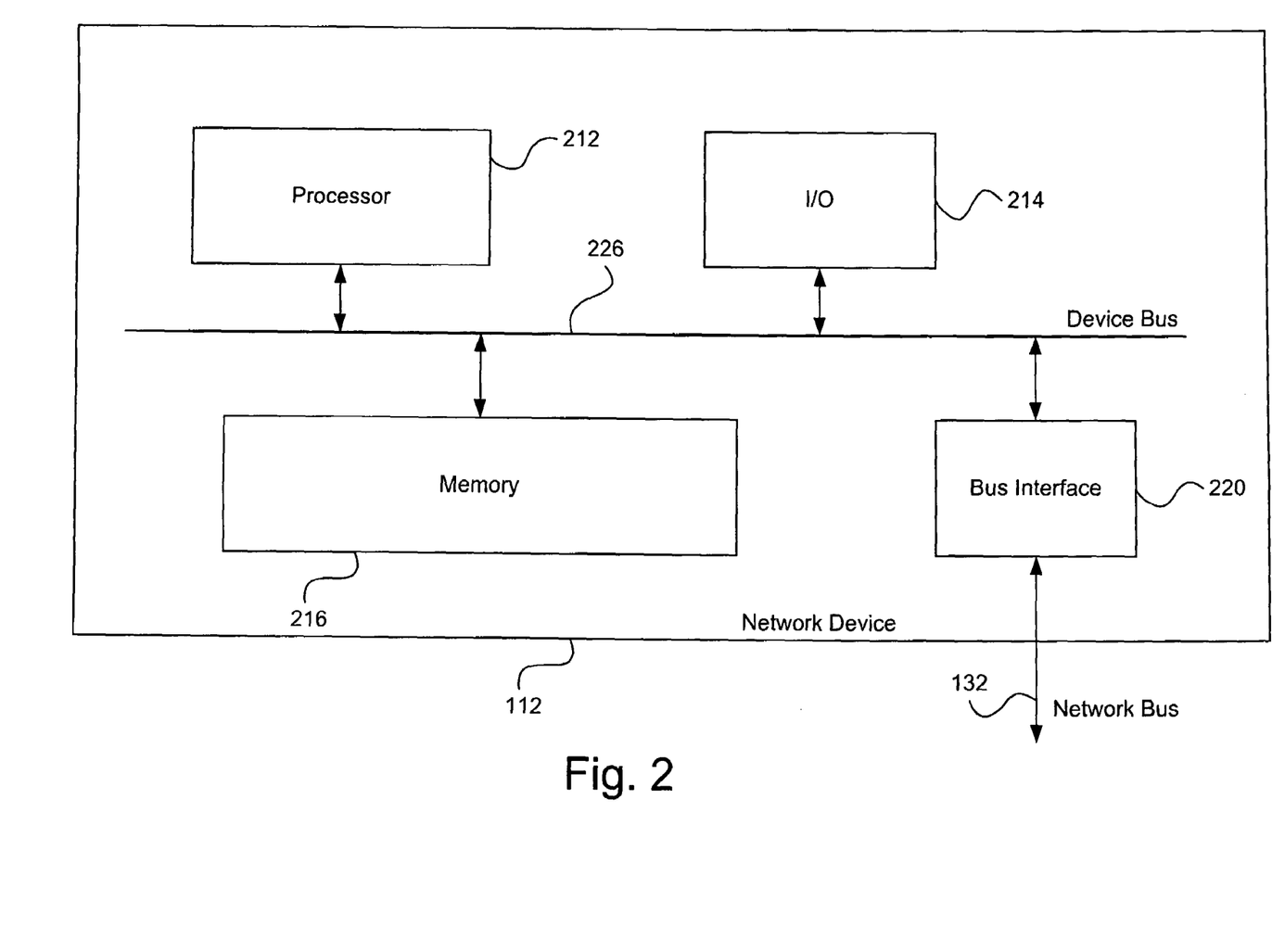
FIG. 2 is a block diagram for one embodiment of an exemplary device of FIG. 1, in accordance with the present invention.

Referring now to FIG. 2, a block diagram for one embodiment of an exemplary device 112 from network 110 is shown, in accordance with the present invention. Device 112 preferably includes, but is not limited to, a processor 212, an input/output (I/O) interface 214, a memory 216, a device bus 226, and a bus interface 220. Processor 212, I/O interface 214, memory 216 and bus interface 220 preferably are each coupled to, and communicate via common device bus 226.

In the FIG. 2 embodiment, processor 212 may be implemented as any appropriate multipurpose microprocessor device. Memory 216 may be implemented as one or more appropriate storage devices, including, but not limited to, read-only memory, random-access memory, and various types of non-volatile memory, such as floppy disc devices or hard disc devices. I/O interface 214 preferably may provide an interface for communications with various compatible sources and/or destinations.

In accordance with the present invention, bus interface 220 preferably provides an interface between device 112 and network 110. In the FIG. 2 embodiment, bus interface 220 preferably communicates with other devices 112 on network 110 via bus link 132. Bus interface 220 also preferably communicates with processor 212, I/O device 214, and memory 216 via common device bus 226.

In the FIG. 2 embodiment, device 112 preferably includes the capability to perform various task that involve isochronous data and isochronous processes. Isochronous data typically includes information that is time-sensitive, and therefore requires deterministic transfer operations to guarantee delivery of the isochronous data in a timely manner. For example, video data that is intended for immediate display must arrive at the appropriate destination in a timely manner in order to prevent jitter or breakup of the corresponding image during display. To achieve this goal, device 112 preferably performs isochronous and other types of processing in segments of time called "cycles".

Scheduling of isochronous processes typically requires a finite time period that is sometimes referred to as "overhead". As the cycle time period is reduced, the overhead becomes a more significant factor because of the reduced amount of time remaining to perform the actual isochronous transfer. In the FIG. 2 embodiment, the cycle time period may be in the proximity of 125 microseconds, with a cycle frequency of approximately eight kilohertz.

Figure 3:
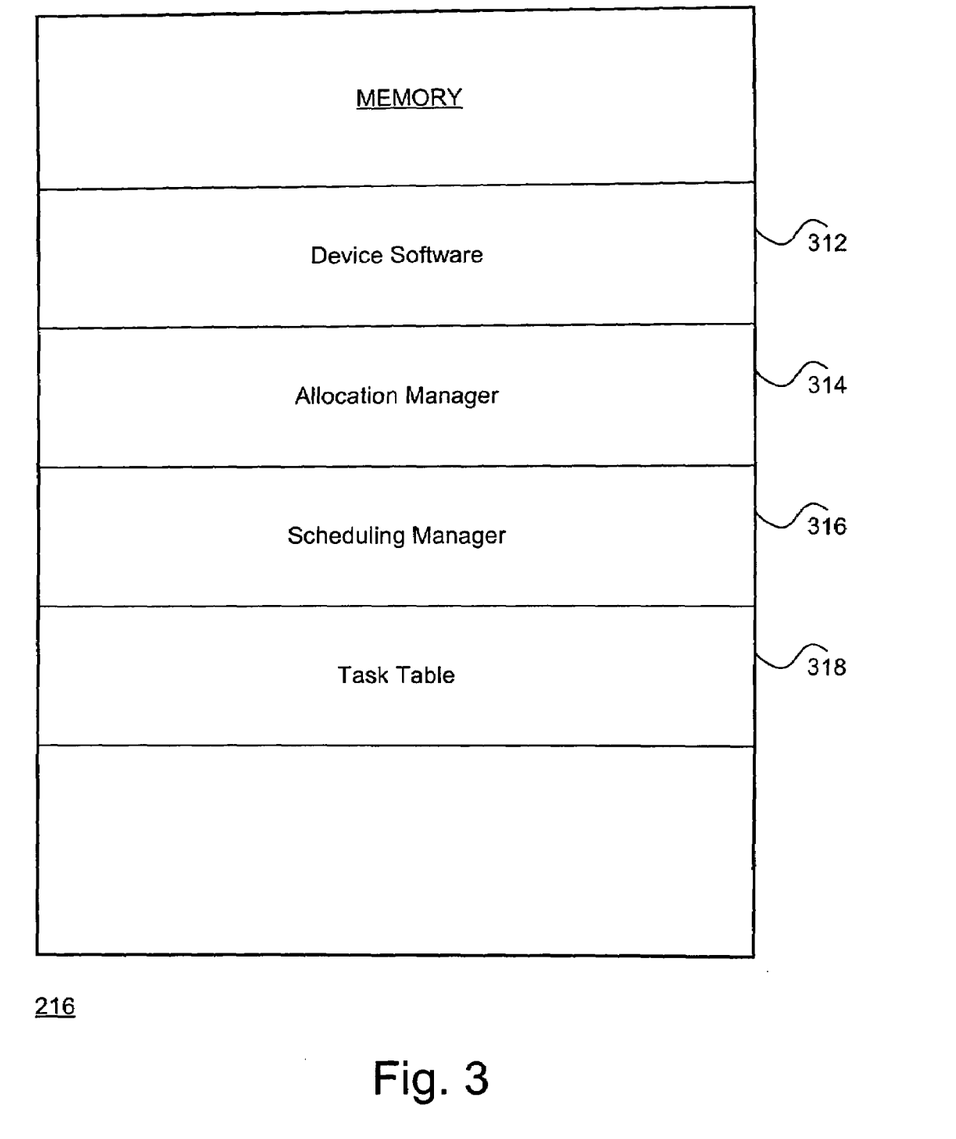
FIG. 3 is a diagram for one embodiment of the memory of FIG. 2, in accordance with the present invention.

Referring now to FIG. 3, a diagram for one embodiment of the FIG. 2 memory 216 is shown, in accordance with the present invention. In the FIG. 3 embodiment, memory 216 preferably includes, but is not limited to, device software 312, allocation manager 314, scheduling manager 316, and task table 318. In alternate embodiments, memory 216 may readily include various other components in addition to, or instead of, the components that are discussed in conjunction with the FIG. 3 embodiment.

In the FIG. 3 embodiment, device software 312 includes software instructions that are preferably executed by processor 212 for performing various functions and operations by device 112. The particular nature and functionality of device software 312 preferably varies depending upon factors such as the type and purpose of the corresponding host device 112.

In the FIG. 3 embodiment, allocation manager 314 preferably may analyze various scheduling request parameters to determine whether a particular task or process may be instantiated on behalf of an entity, such as device software 312. In the FIG. 3 embodiment, scheduling manager 316 preferably controls the scheduling and execution of certain tasks that are authorized by allocation manager 314. In accordance with certain embodiments of the present invention, task table 318 is managed and updated by allocation manager 314 for reference by scheduling manager 316 during various task scheduling and task execution procedures. Allocation manager 314, scheduling manager 316, and task table 318 are further discussed below in conjunction with FIGS. 4 through 9.

Figure 4:
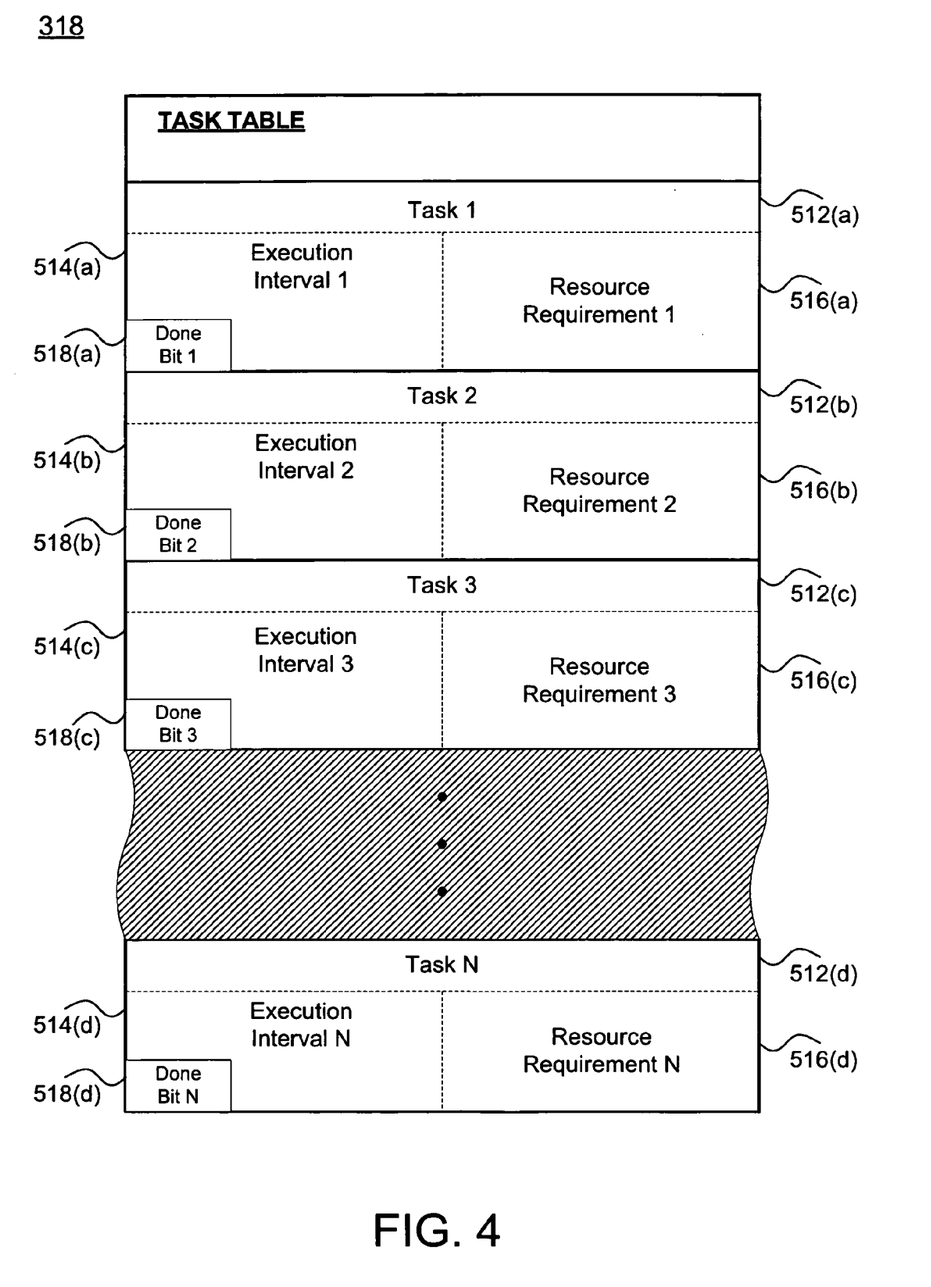
FIG. 4 is a diagram for one embodiment of the task table of FIG. 3, in accordance with the present invention.

Referring now to FIG. 4, a diagram for one embodiment of the FIG. 3 task table 318 is shown, in accordance with the present invention. In the FIG. 4 embodiment, task table 318 preferably includes a task 1 (512(*a*)) through a task N (512(*d*)). Each FIG. 4 task 512(*a*) through 512(*d*) preferably corresponds to a particular task, process, or function performed by device 112. For example, the foregoing task may include any desired process or function, such as a processor operation, a memory access, a data transfer, or a signal processing procedure.

In the FIG. 4 embodiment, each task 512(*a*) through 512(*d*) preferably includes an execution interval, a "done" bit, and a corresponding resource requirement. Therefore, task 1 (512(*a*)) through task N (512(*d*)) each preferably include a corresponding respective execution interval 1 (514(*a*)) through execution interval N (514(*d*)), an associated respective done bit 1 (518(*a*)) through done bit N (518(*d*)), and an associated respective resource requirement 1 (516(*a*)) through resource requirement N (516(*d*)). In alternate embodiments, task table 318 may readily be configured to include various components in addition to, or instead of, those shown in the FIG. 4 embodiment.

In the FIG. 4 embodiment, each execution interval (514(*a*)) through execution interval (514(*d*)) preferably includes a value "T" that specifies a time period within which the corresponding respective task 1 (512(*a*)) through task N (512(*d*)) must complete execution. Resource requirement 1 (516(*a*)) through resource requirement N (516(*d*)) preferably each include relevant information regarding the amount of resources required to execute the corresponding respective task 1 (512(*a*)) through task N (512(*d*)). Resource requirements may include, but are not limited to, bus bandwidth requirements, processor power requirements, or memory requirements.

In the FIG. 4 embodiment, resource requirement 1 (516(*a*)) through resource requirement N (516(*d*)) preferably may be expressed as a percentage of the total available resources of device 112. However, in alternate embodiments, resource requirement 1 (516(*a*)) through resource requirement N (516(*d*)) may be expressed in any appropriate and desired manner.

In the FIG. 4 embodiment, device 112 may set an appropriate done bit 518 to indicate that a corresponding task 512 has been completed during a current isochronous cycle. The functionality and utilization of resource requirements 516, done bits 518, and execution intervals 514 are further discussed below in conjunction with FIGS. 5 through 9.

Figure 5:
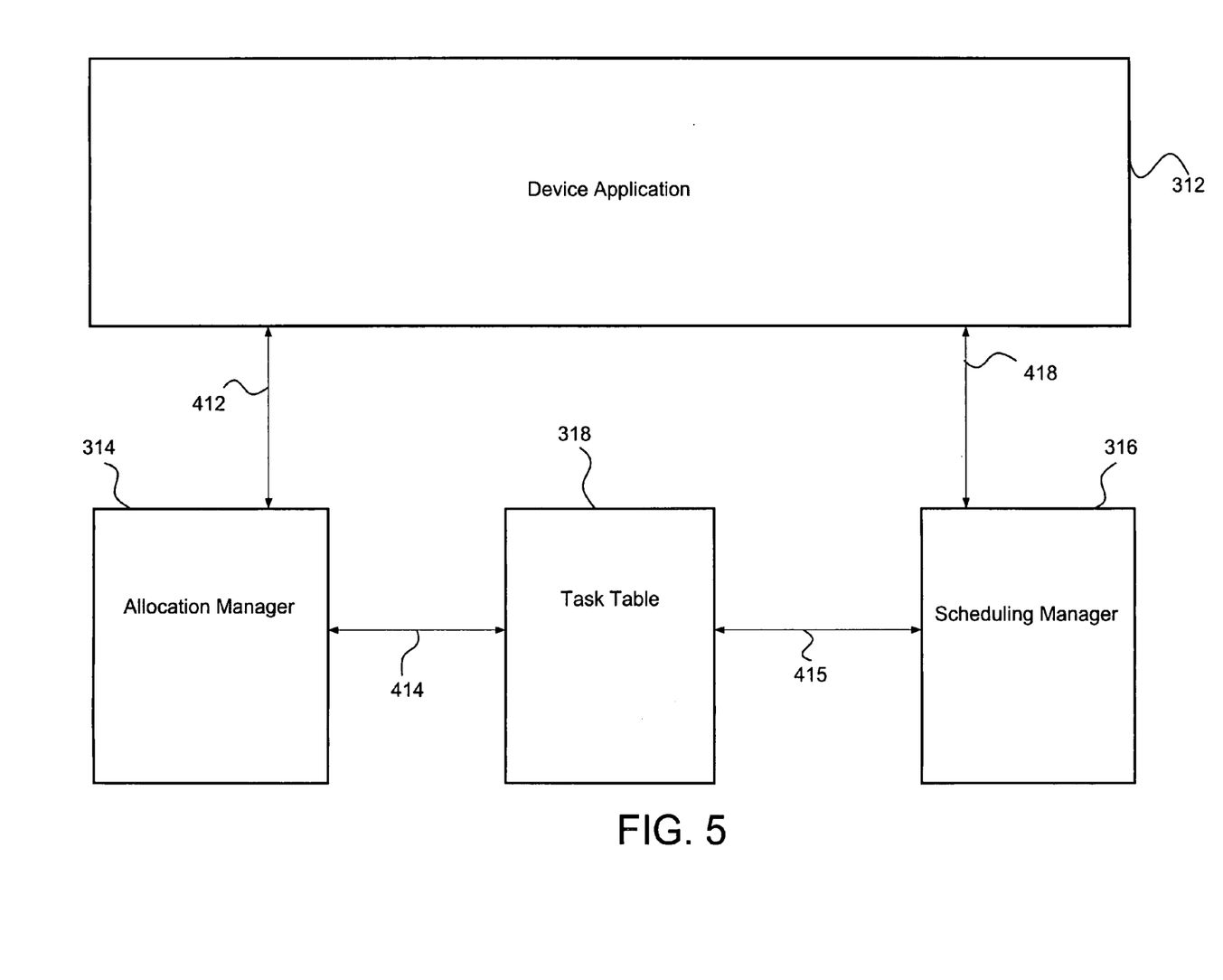
FIG. 5 is a block diagram illustrating a scheduling operation, in accordance with one embodiment of the present invention.

Referring now to FIG. 5, a block diagram illustrating a scheduling operation is shown, in accordance with one embodiment of the present invention. In certain alternate embodiments, scheduling operations may readily be implemented using various other techniques and configurations, in accordance with the present invention.

In the FIG. 5 embodiment, device software 312 initially generates a scheduling request to allocation manager 314 via path 412 to thereby request device 112 to schedule and execute a particular task. Preferably included in the foregoing scheduling request are one or more request parameters. In the FIG. 5 embodiment, the request parameters preferably include an execution interval T and a resource requirement that correspond to the requested task.

As discussed above in conjunction with FIG. 4, the execution interval T preferably includes information that specifies a time period within which the corresponding requested task must complete execution on device 112. The foregoing resource requirement preferable includes information to specify how much of overall device 112 resources will be consumed while executing the corresponding task. In the FIG. 5 embodiment, the resource requirement request parameter is preferably a long-term average of resources required for the corresponding task.

In response, allocation manager 314 determines whether scheduling the requested task is permissible in light of available device 112 resources. In the FIG. 5 embodiment, allocation manager 314 preferably limits allocated resources to a 100 percent level by adding the new resource requirement request parameter to a total current resource allocation value for device 112 to thereby determine whether granting the current scheduling request would require more than 100 percent of the total resources available to device 112.

In addition, allocation manager 314 preferably evaluates the request parameters to ensure that the duration of the execution interval T conforms to certain execution specifications. The constraints placed on the execution interval by the present invention are further discussed below in conjunction with FIGS. 6 through 9.

If sufficient resources are unavailable, or if the execution interval T does not conforms to the execution specifications, then the allocation manager 314 preferably denies the scheduling request, and returns an error message to device application 312 via path 412. However, if sufficient resources are available, and if the execution interval T conforms to the execution specifications, then allocation manager 314 preferably adds the requested task to task table 318 via path 414. In the FIG. 5 embodiment, allocation manager 314 preferably provides the request parameters to task table 318 as execution interval 514 and resource requirement 516 (FIG. 4).

In the FIG. 5 embodiment, allocation manager 314 preferably ranks task 1 (512(a)) through task N (512(d)) within task table in the order of their execution priority. In the FIG. 5 embodiment, allocation manager 314 preferably ranks task 1 (512(a)) through task N (512(d)) according to the duration of their respective execution interval (514(a)) through execution interval (514(d)), with the shortest execution interval 514 having the highest execution priority, and the longest execution interval 514 having the lowest execution priority. Allocation manager 314 may then grant the scheduling request from device application 312, and may preferably return a request grant message to device application 312 via path 412.

In the FIG. 5 embodiment, device 112 preferably may only execute a single task at any given time, and the tasks are preferably executed in the context of a sequential series of contiguous base cycles which each have the same precise duration. As discussed above in conjunction with FIG. 2, in the FIG. 5 embodiment, the base cycle time period may consist of isochronous cycles with durations of 125 microseconds.

In the FIG. 5 embodiment, during the execution of tasks, scheduling manager 316 preferably references task table 318 via path 415 to identify the next task for scheduling and execution on device 112. As discussed above, scheduling manager 316 preferably selects the next task for scheduling and execution by identifying the task 512 that has the highest priority (shortest execution interval) which also has not already consumed its allocated resources during the current base cycle.

Once the next task is identified for scheduling and execution, then scheduling manager 316 preferably references a "ready-to-run" table to determine whether the identified next task is in a ready state. Omission from the "ready-to-run" table informs scheduling manager 316 that a task listed in task table 318 is temporarily not ready for immediate execution.

Presuming that the identified next task is ready, then scheduling manager 316 preferably schedules and starts the execution of that task on device 112. In the FIG. 5 embodiment, scheduling manager 316 then preferably monitors a "resources-consumed" table that is constantly updated to indicate the amount of resources that have been consumed by execution of the current task. Scheduling manager 316 may thus compare the consumed resources with the allocated resources from resource requirement 516, and then terminate a current task when its resource allocation limit is reached.

In the FIG. 5 embodiment, scheduling manager 316 preferably resets the foregoing procedure at the start of each base cycle. In other words, the resources indicated in resource requirements 516 are preferably provided on a cycle-by-cycle basis. Therefore, at the start of each base cycle, scheduling manager 316 preferably references task table 318 via path 415 to restart the scheduling and executing of tasks according to their priority level or execution interval. The present invention thus advantageously utilizes allocation manager 314, task table 318, and scheduling manager 316 to efficiently schedule a sequence of tasks on device 112.

Figures 6, 6C:
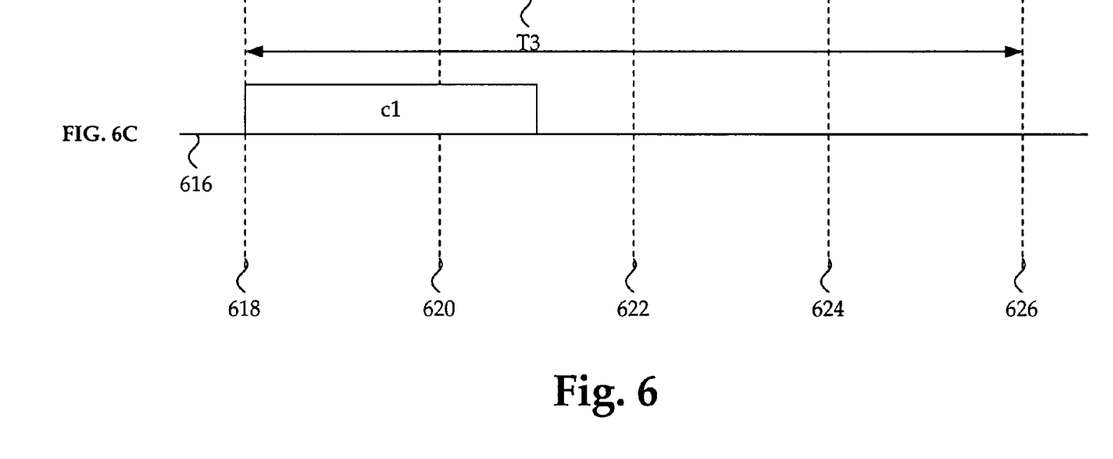
FIG. 6 is a timing diagram illustrating execution intervals for three tasks, in accordance with one embodiment of the present invention.
Figure 6A:
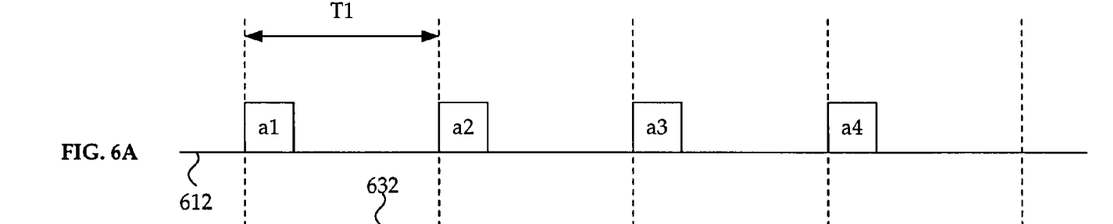
Figure 6B:
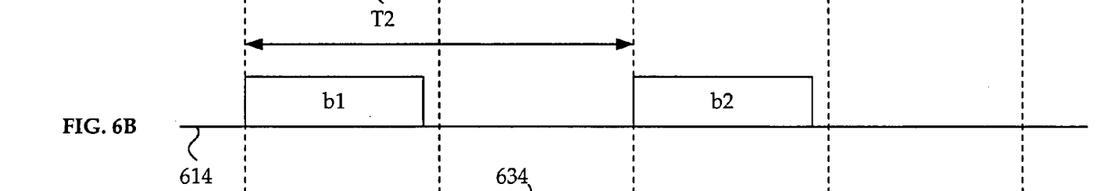

Referring now to FIG. 6, a timing diagram illustrating execution intervals for three tasks is shown, in accordance with one embodiment of the present invention. The FIG. 6 embodiment includes a FIG. 6A 612, a FIG. 6B 614, and a FIG. 6C 616. The timing diagram of FIG. 6 is presented for purposes of illustration only, and in alternate embodiments, the present invention may readily function in the context of various other waveforms, execution intervals, tasks, and timing relationships.

The FIG. 6 embodiment shows a series of contiguous and sequential base cycles that regularly occur in device 112 as a timing reference for performing various tasks. In the FIG. 6 embodiment, the foregoing base cycles are shown beginning at times 618, 620, 622, 624, and 626, respectively. FIGS. 6A, 6B, and 6C each show a different type of task for scheduling and execution on device 112. However, as discussed above, device 112 preferably may only schedule and execute one of the FIG. 6 tasks at any given time.

The FIG. 6A 612 waveform shows a series of tasks a1 through a4 that each preferably must be guaranteed to occur at the start of each base cycle. In the FIG. 6 embodiment, each task of the FIG. 6A 612 waveform preferably must be completed within an execution interval T1 (630) that is equal to the base cycle. In accordance with the present invention, since the tasks a1 through a4 have the shortest execution interval T1 (630), tasks a1 through a4 therefore preferably also have the highest scheduling priority, as discussed above.

Similarly, the FIG. 6B 614 waveform shows tasks b1 and b2. In the FIG. 6 embodiment, each task of the FIG. 6B 614 waveform preferably must be completed within an execution interval T2 (632) that is equal to the base cycle times two raised to the first power. In accordance with the present invention, since the tasks b1 and b2 have the second shortest execution interval T2 (632), then tasks b1 and b2 preferably also have the second highest scheduling priority.

Finally, the FIG. 6C 616 waveform shows task c1. In the FIG. 6 embodiment, the task of the FIG. 6C 616 waveform preferably must be completed within an execution interval T3 (634) that is equal to the base cycle times two raised to the second power. In accordance with the present invention, since the task c1 has the longest execution interval T3 (634), then task c1 preferably also has the lowest scheduling priority.

Therefore, as illustrated above in conjunction with the FIG. 5 timing diagram, allocation manager 314 preferably may evaluate the scheduling request parameters received from device software 312 to ensure that the duration of the execution interval T conforms to precise execution specifications. In the FIG. 6 embodiment, the foregoing execution specifications preferably require that the execution interval for each task be an even multiple of a power of two times the duration of the base cycle.

In the FIG. 6 embodiment, each execution interval T may therefore preferably be expressed by the following formula:

$$T = (t_{base})2^n$$

where $t_{base}$ is the duration of the base cycle, and T is the execution interval required for scheduling and executing any task on device 112.

In alternate embodiments, execution intervals for the various tasks may be related to the base cycle in any other appropriate manner that produces a symmetrical relationship between the various execution intervals. For example, the execution specifications of device 112 may require the execution interval for each task to be an even multiple of a power of any integer (e.g. three or four) times the duration of the base cycle.

The present invention therefore advantageously places constraints upon the execution intervals of tasks scheduled for execution on device 112 to thereby facilitate scheduling efficiency. Limiting the execution intervals according to the present invention preferably eliminates skew between start times of various tasks, and thereby allows scheduling processes to more predictably function within a symmetrical scheduling format.

Figure 7:
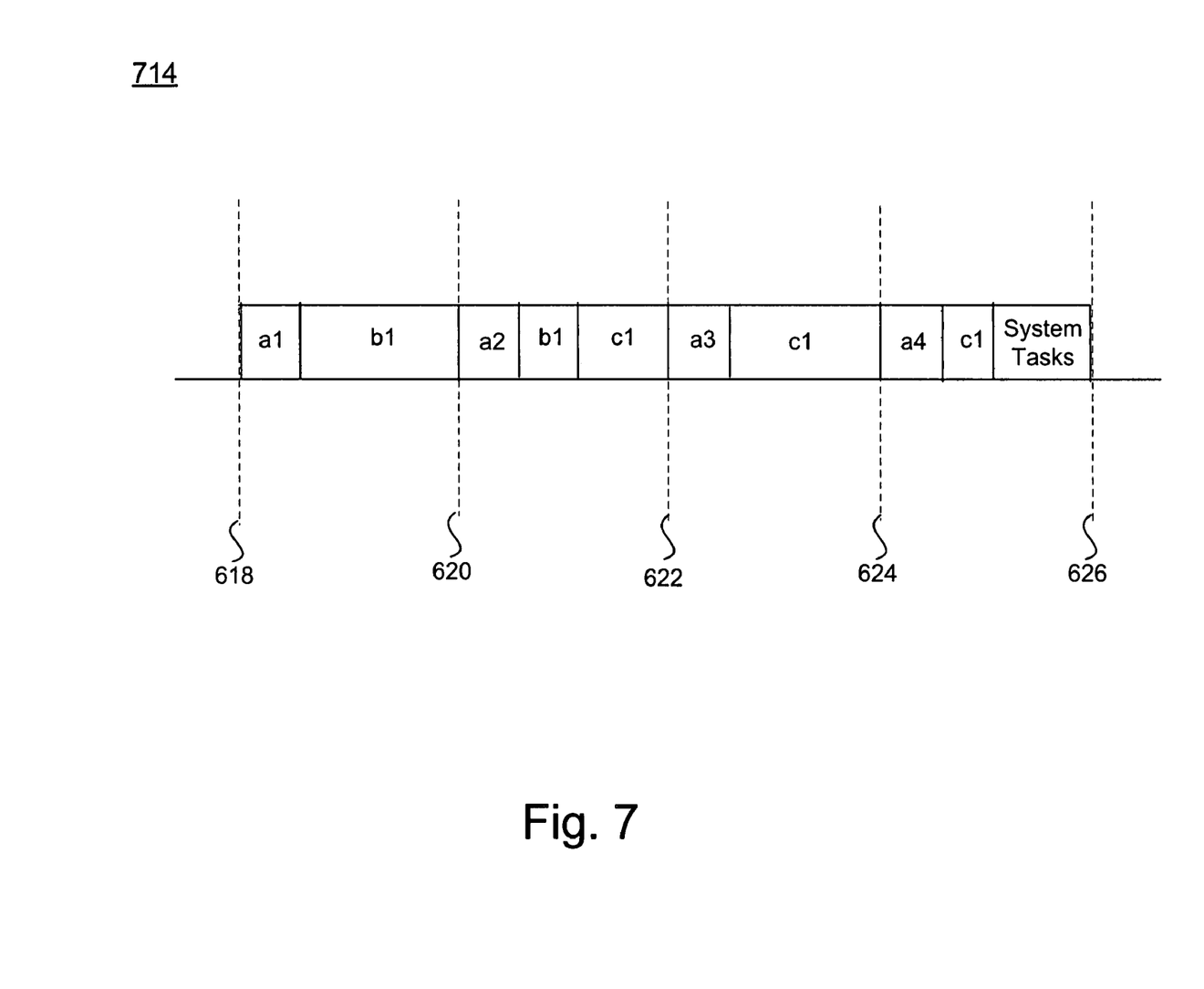
FIG. 7 is a timing diagram illustrating a scheduling sequence for the three tasks of FIG. 6, in accordance with one embodiment of the present invention.

Referring now to FIG. 7, a timing diagram illustrating a scheduling sequence for the three tasks of FIG. 6 is shown, in accordance with one embodiment of the present invention. In alternate embodiments, the present invention may readily produce various scheduling sequences other than that shown in the FIG. 7 embodiment.

Like the foregoing FIG. 6 embodiment, the FIG. 7 embodiment shows a series of sequential base cycles that occur in device 112 as timing references for scheduling and executing various tasks. In the FIG. 7 embodiment, the foregoing base cycles are shown beginning at times 618, 620, 622, 624, and 626, respectively.

In the FIG. 7 embodiment, at time 618, a task a1 (with highest priority and lowest execution interval) is preferably scheduled for execution. After task a1 utilizes its allocated resources, then task a1 is preferably followed by an initial portion of a task b1 (second highest priority). At the start of the next base cycle, at time 620, a cycle reset occurs, and a task a2 (with highest priority and lowest execution interval) is preferably scheduled for execution.

After task a2 utilizes its allocated resources, then task a2 is preferably followed by a final portion of a task b1 (second highest priority). After task b1 utilizes its allocated resources, then task b1 is preferably followed by a first portion of a task c1 (lowest priority).

At the start of the next base cycle, at time 622, a cycle reset occurs, and a task a3 (with highest priority and lowest execution interval) is preferably scheduled for execution. After task a3 utilizes its allocated resources, then task a3 is preferably followed by a second portion of a task c1 (lowest priority).

At the start of the next base cycle, at time 624, a cycle reset occurs, and a task a4 (with highest priority and lowest execution interval) is preferably scheduled for execution. After task a4 utilizes its allocated resources, then task a4 is preferably followed by a final portion of a task c1 (lowest priority). After task c1 utilizes its allocated resources, then device 112 may perform various systems tasks until the next base cycle begins at time 626.

Figure 8:
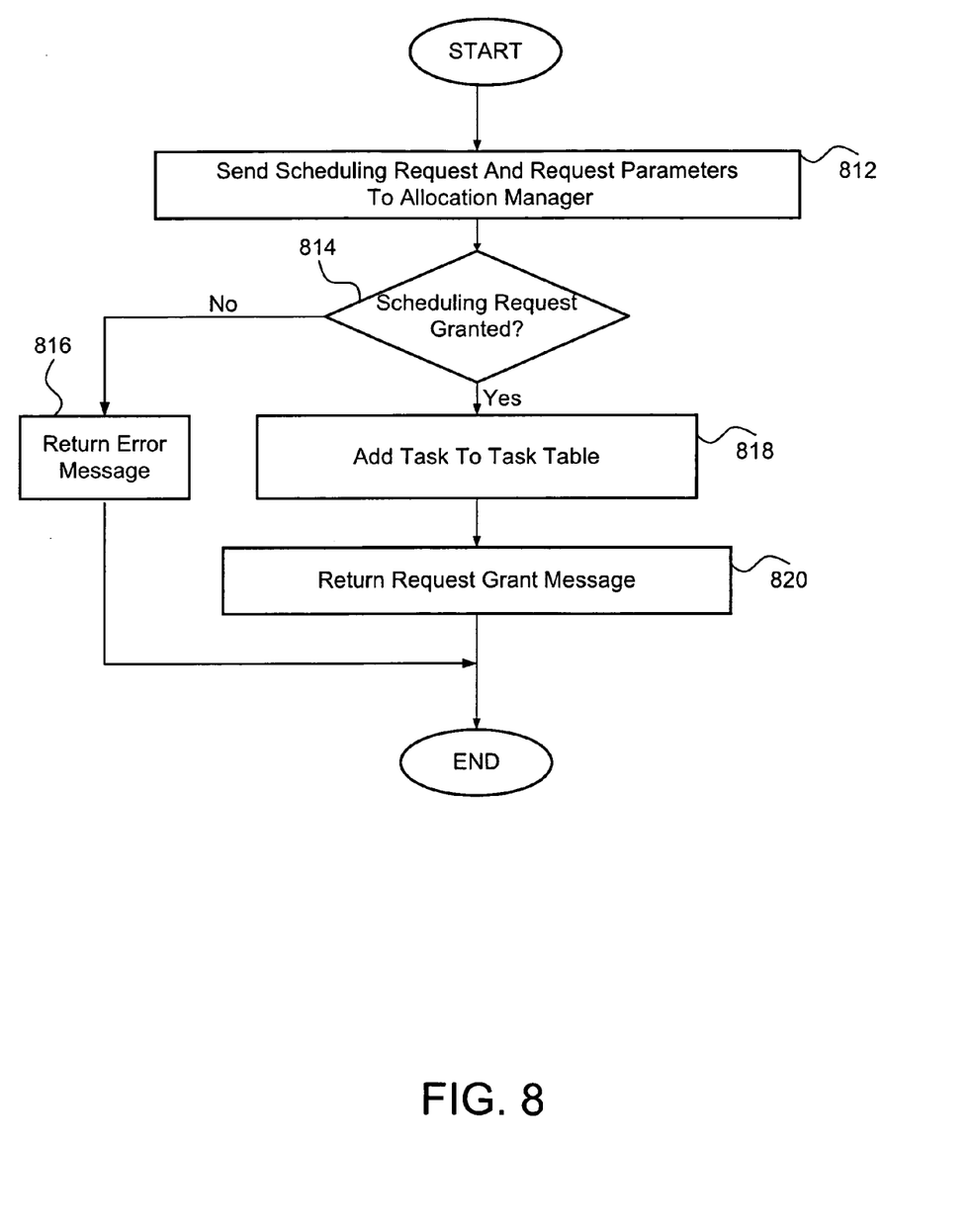
FIG. 8 is a flowchart of method steps for handling a scheduling request, in accordance with one embodiment of the present invention.

Referring now to FIG. 8, a flowchart of method steps for handling a scheduling request is shown, in accordance with one embodiment of the present invention. In alternate embodiments, various other steps and sequences may also be utilized for handling a scheduling request in accordance with the present invention.

In the FIG. 8 embodiment, initially, in step 812, an entity (such as device application 312) preferably sends a scheduling request and request parameters to allocation manager 314 to request the scheduling and execution of a particular task. Then, in step 814, allocation manager 314 preferably determines whether to grant the scheduling request based on various criteria, including those criteria discussed above in conjunction with FIG. 5.

In the event that allocation manager 314 does not grant the scheduling request, then, in step 816, allocation manager 314 preferably returns an error message to the requesting entity to deny the scheduling request. However, if allocation manager 314 grants the scheduling request, then, in step 818, allocation manager 314 preferably adds the correspond task to task table 318 (FIG. 4). Finally, in step 820, allocation manager 314 preferably returns a request grant message to the requesting entity to grant the scheduling request, and the FIG. 8 process terminates.

Figure 9:
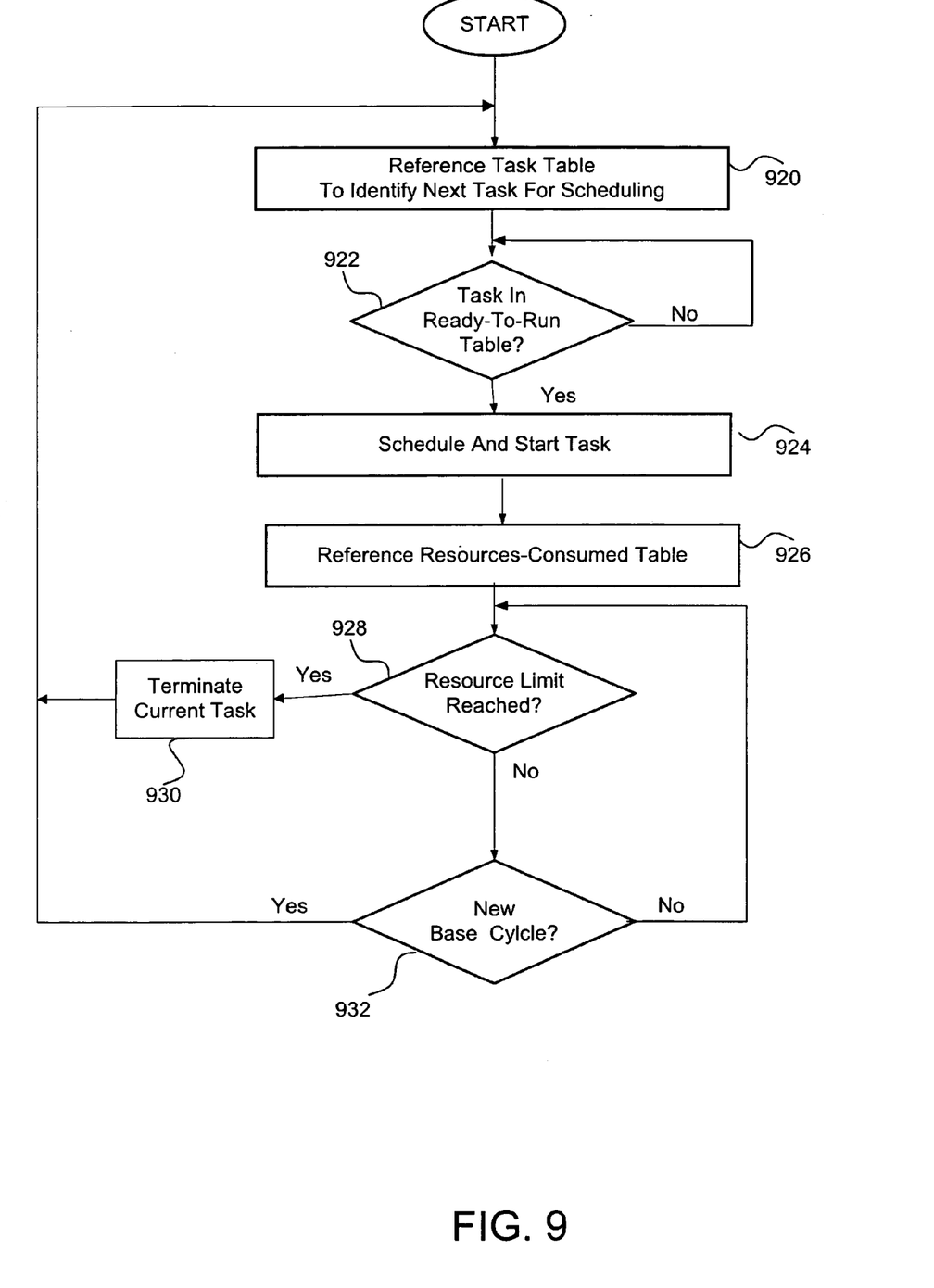
FIG. 9 is a flowchart of method steps for scheduling and executing tasks, in accordance with one embodiment of the present invention.

Referring now to FIG. 9, a flowchart of method steps for scheduling and executing tasks is shown, in accordance with one embodiment of the present invention. In alternate embodiments, various other steps and sequences may also be utilized for scheduling and executing tasks in accordance with the present invention.

In the FIG. 9 embodiment, initially, in step 920, scheduling manager 316 preferably references task table 318 to identify a next task for scheduling based on a priority scheme, such as the priority scheme discussed above in conjunction with FIG. 5. After the next task is identified, then scheduling manager 316 preferably determines whether the identified task is in a "ready-to-run" table.

If the task is listed in the ready-to-run table, then, in step 924, scheduling manager 316 may preferably schedule and start executing the identified task. In step 928, scheduling manager 316 preferably determines whether an allocated resource limit has been reached for the particular task by comparing a "resources-consumed" table and the resources originally allocated for the task.

If the allocated resource limit has been reached, then in step 930, scheduling manager 316 preferably terminates the current task and the FIG. 9 process returns to step 920. However, if the allocated resource limit has not been reached, then in step 932, scheduling manager 316 preferably determines whether a new base cycle is scheduled to begin. In the event that a new base cycle is not scheduled to begin immediately, then the FIG. 9 process returns to step 928. However, if a new base cycle is scheduled to begin immediately, then the FIG. 9 process returns to step 920, and the foregoing process for scheduling and execution of tasks repeats.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for effectively performing a scheduling operation for an electronic device, comprising:
   an allocation manager configured to handle a scheduling request from device software of said electronic device by analyzing request parameters for authorizing said scheduling request;
   a scheduling manager configured to schedule a task that is authorized by said allocation manager; and
   a processor for controlling said allocation manager and said scheduling manager to thereby perform said scheduling operation, wherein said request parameters include a resource requirement and an execution interval for performing said task, said execution interval being a maximum time period within which said task must be executed, wherein said scheduling operation is synchronized to a base cycle that serves as a timing reference for performing said task, said base cycle forming part of a contiguous base cycle sequence, wherein said allocation manager analyzes said execution interval to ensure that an execution interval duration T conforms to a symmetrical execution-interval specification requirement.

2. The system of claim 1 wherein said task includes one or more isochronous processes that require a deterministic and guaranteed performance.

3. The system of claim 1 wherein said scheduling operation is performed in an electronic network that is implemented according to an IEEE Std 1394 serial bus interconnectivity standard.

4. The system of claim 1 wherein said task is performed on said electronic device that includes one of a consumer-electronics device, an audio-visual device, a set-top box device, and a computer device.

5. The system of claim 1 wherein said task includes one of a data transfer operation, a processor operation, a memory-access operation, and a signal-processing operation.

6. The system of claim 1 wherein said device software issues said scheduling request to said allocation manager for scheduling said task.

7. The system of claim 1 wherein said allocation manager analyzes said resource requirement to limit total allocated device resources to one-hundred percent of available device resources.

8. The system of claim 6 wherein said allocation manager analyzes said scheduling request and returns one of an error message or a request grant message.

9. The system of claim 6 wherein said allocation manager adds said task to a task table along with at least one of said resource requirement and said execution interval.

10. The system of claim 9 wherein said allocation manager assigns a scheduling priority level to said task, said scheduling priority level being inversely proportional to said execution interval.

11. The system of claim 10 wherein said scheduling manager references said task table to identify said task for scheduling based upon said scheduling priority level.

12. The system of claim 11 wherein said scheduling manager references a ready-to-run table to determine whether said task can immediately be scheduled and executed.

13. The system of claim 11 wherein said scheduling manager schedules and begins executing said task.

14. The system of claim 13 wherein said scheduling manager references a resources-consumed table to determine whether said task has consumed all allocated resources, said scheduling manager terminating said task when an allocated-resource limit is reached.

15. The system of claim 13 wherein said processor resets said scheduling operation when a new base cycle begins.

16. The system of claim 1 wherein said scheduling operation includes a plurality of tasks that are scheduled to execute in a sequence in which only one of said plurality of tasks may execute at any given moment.

17. A system for effectively performing a scheduling operation for an electronic device, comprising:
an allocation manager configured to handle a scheduling request from device software of said electronic device by analyzing request parameters for authorizing said scheduling request that include at least one of a resource requirement and an execution interval for performing said task;
a scheduling manager configured to schedule a task that is authorized by said allocation manager; and
a processor for controlling said allocation manager and said scheduling manager to thereby perform said scheduling operation, said scheduling operation being synchronized to a base cycle that serves as a timing reference for performing said task, said base cycle forming part of a contiguous base cycle sequence, said allocation manager analyzing said execution interval to ensure that an execution interval duration T conforms to a symmetrical execution-interval specification requirement, said symmetrical execution interval specification requirement being expressed by a formula:

$$T = (t_{base})2^n$$

where $t_{base}$ is a duration of said base cycle, and T is said execution interval duration required for executing said task.

18. A method for effectively performing a scheduling operation for an electronic device, comprising the steps of:
handling a scheduling request from device software of said electronic device by analyzing request parameters for authorizing said scheduling request with an allocation manager;
utilizing a scheduling manager to schedule a task that is authorized by said allocation manager; and
controlling said allocation manager and said scheduling manager with a processor to thereby perform said scheduling operation, wherein said request parameters include a resource requirement and an execution interval for performing said task, said execution interval being a maximum time period within which said task must be executed, wherein said scheduling operation is synchronized to a base cycle that serves as a timing reference for performing said task, said base cycle forming part of a contiguous base cycle sequence, wherein said allocation manager analyzes said execution interval to ensure that an execution interval duration T conforms to a symmetrical execution-interval specification requirement.

19. The method of claim 18 wherein said task includes one or more isochronous processes that require a deterministic and guaranteed performance.

20. The method of claim 18 wherein said scheduling operation is performed in an electronic network that is implemented according to an IEEE Std 1394 serial bus interconnectivity standard.

21. The method of claim 18 wherein said task is performed on said electronic device that includes one of a consumer-electronics device, an audio-visual device, a set-top box device, and a computer device.

22. The method of claim 18 wherein said task includes one of a data transfer operation, a processor operation, a memory-access operation, and a signal-processing operation.

23. The method of claim 18 wherein said device software issues said scheduling request to said allocation manager for scheduling said task.

24. The system of claim 18 wherein said allocation manager analyzes said resource requirement to limit total allocated device resources to one-hundred percent of available device resources.

25. The method of claim 18 wherein said allocation manager analyzes said scheduling request and returns one of an error message or a request grant message.

26. The method of claim 18 wherein said allocation manager adds said task to a task table along with at least one of said resource requirement and said execution interval.

27. The method of claim 26 wherein said allocation manager assigns a scheduling priority level to said task, said scheduling priority level being inversely proportional to said execution interval.

28. The method of claim 27 wherein said scheduling manager references said task table to identify said task for scheduling based upon said scheduling priority level.

29. The method of claim 28 wherein said scheduling manager references a ready-to-run table to determine whether said task can immediately be scheduled and executed.

30. The method of claim 28 wherein said scheduling manager schedules and begins executing said task.

31. The method of claim 30 wherein said scheduling manager references a resources-consumed table to determine whether said task has consumed all allocated resources, said scheduling manager terminating said task when an allocated-resource limit is reached.

32. The method of claim 30 wherein said processor resets said scheduling operation when a new base cycle begins.

33. The method of claim 18 wherein said scheduling operation includes a plurality of tasks that are scheduled to execute in a sequence in which only one of said plurality of tasks may execute at any given moment.

34. A method for effectively performing a scheduling operation for an electronic device, comprising the steps of:
handling a scheduling request from device software of said electronic device by analyzing request parameters for authorizing said scheduling request with an allocation manager, said request parameters including at least one of a resource requirement and an execution interval for performing said task;
utilizing a scheduling manager to schedule a task that is authorized by said allocation manager; and
controlling said allocation manager and said scheduling manager with a processor to thereby perform said scheduling operation, said scheduling operation being synchronized to a base cycle that serves as a timing reference for performing said task, said base cycle forming part of a contiguous base cycle sequence, said allocation manager analyzing said execution interval to ensure that an execution interval duration T conforms to a symmetrical execution-interval specification requirement, said symmetrical execution interval specification requirement being expressed by a formula:

$$T=(t_{base})2^n$$

where $t_{base}$ is a duration of said base cycle, and T is said execution interval duration required for executing said task.

35. A computer-readable medium containing program instructions for performing scheduling operations for an electronic device by performing the steps of:
handling a scheduling request by analyzing request parameters for authorizing said scheduling request from device software of said electronic device with an allocation manager;
utilizing a scheduling manager to schedule a task that is authorized by said allocation manager; and
controlling said allocation manager and said scheduling manager with a processor to thereby perform said scheduling operation, wherein said request parameters include a resource requirement and an execution interval for performing said task, said execution interval being a maximum time period within which said task must be executed, wherein said scheduling operation is synchronized to a base cycle that serves as a timing reference for performing said task, said base cycle forming part of a contiguous base cycle sequence, wherein said allocation manager analyzes said execution interval to ensure that an execution interval duration T conforms to a symmetrical execution-interval specification requirement.

36. A system for effectively performing a scheduling operation for an electronic device, comprising:
means for handling a scheduling request by analyzing request parameters for authorizing said scheduling request from device software of said electronic device;
means for scheduling a task that is authorized by said means for handling said scheduling request; and
means for controlling said means for handling said scheduling request and said means for scheduling tasks to thereby perform said scheduling operation, wherein said request parameters include a resource requirement and an execution interval for performing said task, said execution interval being a maximum time period within which said task must be executed, wherein said scheduling operation is synchronized to a base cycle that serves as a timing reference for performing said task, said base cycle forming part of a contiguous base cycle sequence, wherein said allocation manager analyzes said execution interval to ensure that an execution interval duration T conforms to a symmetrical execution-interval specification requirement.

37. A system for effectively performing a task scheduling operation for an electronic device, comprising:
an allocation manager configured to handle a scheduling request from device software of said electronic device, said scheduling request corresponding to a processing task of said electronic device, said allocation manager analyzing request parameters for authorizing said scheduling request, said request parameters including a resource requirement and an execution interval within which said processing task must be executed;
a scheduling manager configured to schedule said processing task after said processing task has been authorized by said allocation manager; and
a processor for controlling said allocation manager and said scheduling manager to perform said task scheduling operation, said task scheduling operation being synchronized to a base execution cycle of said electronic device, said allocation manager authorizing said processing task only when said execution interval is equal to an even multiple of a power of two times a cycle duration of said base cycle.

* * * * *